May 18, 1965  K. GROETZNER  3,184,666
DYNAMIC BRAKE FOR A COMPOUND MOTOR CONTROL SYSTEM
Filed May 25, 1962
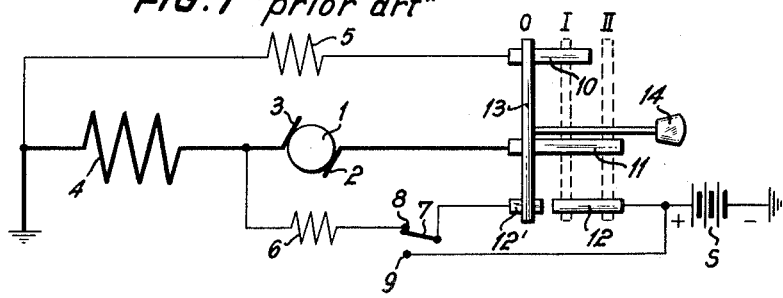
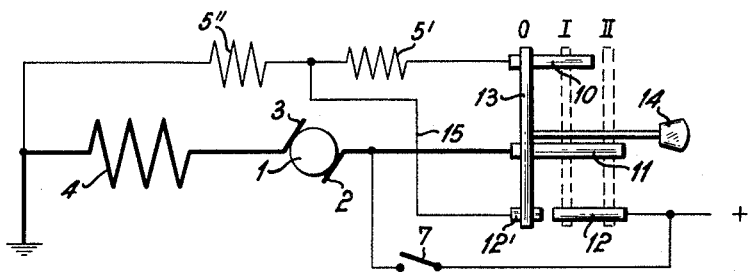
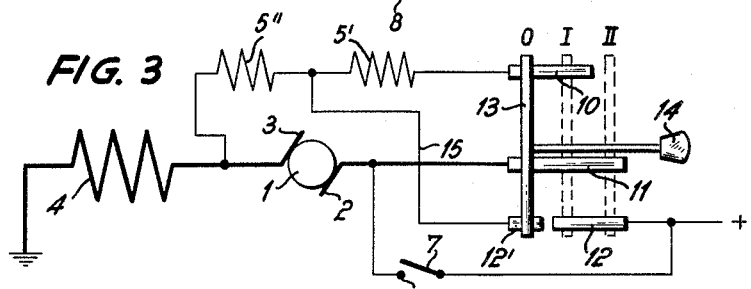
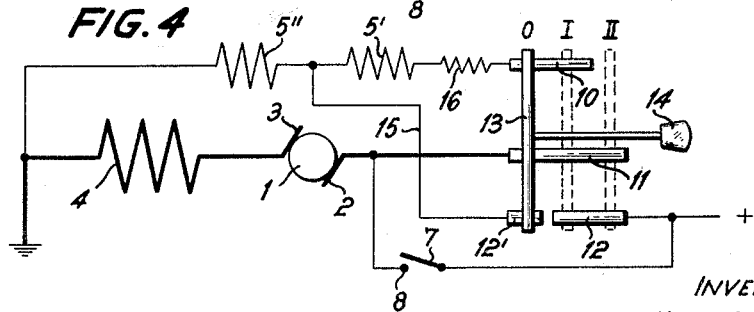
INVENTOR
Kurt Groetzner
by:
Michael J. Striker United States Patent Office 3,184,666
Patented May 18, 1965

3,184,666
DYNAMIC BRAKE FOR A COMPOUND MOTOR CONTROL SYSTEM
Kurt Groetzner, Stuttgart-Zuffenhausen, Germany, assignor to Robert Bosch G.m.b.H., Stuttgart, Germany
Filed May 25, 1962, Ser. No. 197,738
Claims priority, application Germany, June 22, 1961, B 62,993
8 Claims. (Cl. 318—381)

The present invention concerns a dynamic brake for a compound motor control system arrangement, particularly suitable for the operation of windshield wipers on automotive and other vehicles.

Arrangements of this type conventionally include a control switch for starting and terminating the operation of the motor. However, in order to bring the motor to a rapid standstill, in addition to the conventional shunt exciter winding and the conventional series-exciter winding, an additional winding is provided which serves as a braking means for electrically absorbing dynamic energy stored in the rotor of the motor after its disconnection from the source of energy. Therefore, the control switch must be so connected with the motor and with the additional braking winding that the latter is connected in series with the rotor when the motor is disconnected.

In conventional windshield wiper installations comprising a compound motor arrangement as set forth, an additional switch is required by means of which the braking winding is short-circuited with the rotor only when the windshield wiper reaches its end position.

It has been found desirable to simplify the conventional arrangement described above so as to reduce the production cost and the space requirements of the arrangement.

It is therefore one of the objects of the invention to provide for a compound motor arrangement in which the rotor can be brought to a rapid standstill after the disconnection of the motor from the source of energy, without providing a separate braking winding and control switch therefor.

It is another object of the invention to provide for an arrangement of this type which is entirely reliable and economical in operation.

With above objects in mind the invention includes a compound motor arrangement, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding connected as a series-combination with each other, one end of said series-combination of shunt windings being conductively connected with said first brush means; and control switch means connected between the other terminal of said source, said shunt exciter means and said second brush means, and movable between at least two positions in one of which said other terminal of said source is connected both with the other end of said series-combination of shunt windings and with said second brush means for causing normal operation of the compound motor, while in the second position causing discontinuation of the motor operation said first shunt winding is short-circuited and said second shunt winding is connected in series with said rotor so a to act as a braking means electrically absorbing dynamic energy stored in said rotor after its disconnection from said source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic diagram of a compound motor arrangement according to the prior art;

FIG. 2 is a schematic diagram of an embodiment of the present invention;

FIG. 3 is a modification of the embodiment shown in FIG. 2; and

FIG. 4 is a further modification of the embodiment illustrated by FIG. 3.

The invention will be best understood from first considering the characteristic features of a compound motor arrangement according to the prior art as illustrated in FIG. 1. This arrangement comprises a compound motor composed mainly of a rotor 1 cooperating with two brushes 2 and 3, a series-exciter winding 4 and a shunt exciter winding 5. Additionally there is provided a brake winding 6. The brake winding 6 is connected at one end with the brush 3 and at the other end with a stationary contact 8 of a change-over switch 7 which is movable to a second position in which it contacts a second stationary contact 9. The switch 7, 8, 9 is a limit switch and cooperates or is controlled by e.g. a windshield wiper if the motor is provided for operating such a windshield wiper. As long as the windshield wiper is not in one of its end positions the switch member 7 is in engagement with the contact 9, but when the windshield wiper reaches an end position the member 7 engages a contact 8. In this position the switch 7, 8 serves to short-circuit the braking winding 6 with the rotor 1 under certain conditions described further below. The above-described compound motor is controlled by a multiple switch which, in this embodiment, comprises two stationary contact strips 10 and 11 and a third stationary contact strip divided into two portions 12 and 12'. A switching member 13 is adapted to be moved by means of a handle or the like 14 between three positions marked O, I and II in contact with several or all of the above mentioned contact strips. In the position O the switching member 13 conductively connects the strips 10 and 11 with each other and with the strip portion 12'; in position I it connects the strips 10 and 11 with each other and with the strip portion 12; and in position II it connects only the strip 11 with the strip portion 12. As can be seen the positive terminal of the battery or other source of direct current energy S is connected with the stationary contact 9 and with the strip portion 12, the strip portion 12' is connected with the switch member 7, the strip 11 is connected with the brush 2 and the strip 13 is connected with one end of the shunt winding 5. The brush 3 is connected with one end of the series winding 4 and the other end thereof as well as the other end of the shunt winding 5 are connected to electrical ground and thereby to the negative terminal of the source S. In the position O of the switching member 13 the motor is disconnected from the source S but the braking winding 6 is connected through the switch 7, 8 in the illustrated position in short-circuit with the rotor 1. In the position I the source S is connected in circuit with the shunt winding 5 as well as with the series-combination of rotor 1 and series winding 4. In this position of the control switch the motor operates as a compound motor at a certain speed. In the position II the source S is connected only in circuit with the series-combination of the rotor 1 and the series winding 4 in which case the motor operates without shunt excitation at a different speed. Of course, if two different speeds are not desired, then the contact strip 10 and position II may be omitted and the first mentioned end of the shunt winding 5 may also be connected to the contact strip 11.

When in a conventional arrangement according to FIG. 1 the switching member 13 is located in position O for disconnecting the motor from the source S, then it can be expected that as a rule the contact member 7 of the limit switch will still be in engagement with contact 9 so that the rotor 1 still is supplied with energy from the positive terminal of the source S via 9, 7, 12′ and 13 and brush 2 until the associated windshield wiper reaches an end position in which the contact member 7 is moved into the illustrated position engaging the contact 8. Hereby any further supply of energy to the rotor is completely interrupted and the braking winding 6 is connected in short-circuit with the rotor 1. Any further current now generated by the still rotating rotor 1 flows now through the braking winding 6 and produces a magnetic field by which the rotor is slowed down and brought to a rapid standstill in a well known manner.

In the embodiments of the invention illustrated by FIGS. 2, 3 and 4 all those elements of the arrangement which are identical with those described in relation to FIG. 1 are designated by the same reference numerals. One characteristic difference between the arrangement according to FIG. 1 and the embodiments of the invention according to FIGS. 2–4 is that the shunt exciter winding is divided into two portions, a first shunt winding 5′ and a second shunt winding 5″. Another difference is that the limit switch has only one stationary contact 8 and one movable contact member 7. No separate braking winding 6 is provided. Instead the contact 8 is directly connected with the brush 2 and the contact member 7 is directly connected to the positive terminal of the source of energy. A junction point between the first and second shunt windings 5′ and 5″ is connected by a line 15 with the strip member 12′. As will be shown the two shunt windings 5′ and 5″ operate under certain conditions like the shunt exciter winding 5, while under other conditions the shunt winding 5″ acts as a braking winding.

In the embodiment according to FIG. 2 one end of the series-combination of shunt windings 5′ and 5″ is connected in the same manner as the remote end of the series winding 4 with electrical ground and thereby with the negative terminal of the source of energy. When the control switch is in position I exciter current flows from the positive terminal of the source through the strip portion 12, switching member 13 and strip 10 through the series-combination of windings 5′ and 5″ so as to energize the latter while simultaneously the series connection of rotor 1 and series winding 4 is energized via strip 11. In the control switch position II the shunt windings 5′ and 5″ are disconnected from the source and the motor is energized only via strip 11. However, in the control switch position O the source of energy is disconnected from the strips 10 and 11 and the shunt winding 5′ is short-circuited in itself via line 15, strip portion 12′, switching member 13 and strip 10 so as to be ineffective. However, at the same time the series-combination of rotor 1 and series winding 4 is short-circuited through the shunt winding 5″ via line 15, strip portion 12′, switching member 13 and strip 11 so that the shunt winding 5″ now acts as a braking means in the manner described above. Of course, as long as the limit switch 7, 8 is in closed position the rotor 1 will be still rotate against the action of the braking winding 5″ until the limit switch 7, 8 is moved to open position whereafter the braking winding 5″ brings the rotor 1 to a rapid standstill.

The only difference between the embodiment according to FIG. 3 and that according to FIG. 2 is that the shunt winding 5″ is connected at one end with a junction point between the rotor 1 and the series-exciter winding 4.

Finally the embodiment according to FIG. 4 differs from that illustrated by FIG. 2 by the addition of a resistor 16 connected between the shunt winding portion 5′ and the strip 10. This embodiment is of advantage if the compound motor is operated at voltages above 20 or 30 volts because in this case the thickness of the wire constituting the shunt winding 5′ would have to be so small that production would be difficult. By inserting the resistor 16 it is possible to use a considerably thicker wire for the winding 5′.

It is an advantage of the arrangement according to the invention that the two individual shunt windings of the exciter system can be easily and effectively adapted to their different tasks by suitably choosing their lengths and wire diameters, respectively. The one winding serves mainly as exciter winding and may have a comparatively high resistance, while the other winding may have a much lower resistance and mainly serves as a means of braking the motor when the latter is switched off.

It will be understood that each of the elements described above, or two or more together, may also find a useful application in other types of compound motor arrangement differing from the types described above.

While the invention has been illustrated and described as embodied in compound motor arrangement particularly suitable for the operation of windshield wipers on automotive and other vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding connected as a series-combination with each other, one end of said series-combination of shunt windings being conductively connected with said first brush means; and control switch means connected between the other terminal of said source, said shunt exciter means and said second brush means, and movable between at least two positions in one of which said other terminal of said source is connected both with the other end of said series-combination of shunt windings and with said second brush means for causing normal operation of the compound motor, while in the second position causing discontinuation of the motor operation said first shunt winding is short-circuited and said second shunt winding is connected in series with said rotor so as to act as a braking means electrically absorbing dynamic energy stored in said rotor after its disconnection from said source.

2. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding connected as a series-combination with each other, one end of said series-combination of shunt windings being conductively connected with said first brush means; and control switch means connected between the other terminal of said source, said shunt exciter means and said second brush means, said switch means including a group of contact means and a switching member, said group and said switching member being movable relative to each other between at least two positions, first contact means of said group being connected with said other terminal of said source, second contact means of said group being conductively connected with the other end of said series-combination of shunt windings and with said second brush means, and third contact means of said group being connected with the junction point between said first and second shunt windings, said switching member connecting in one of said positions of said switch means said first contact means with said second contact means for causing normal operation of the compound motor, while in the second position causing discontinuation of the motor operation said switching member connects said second contact means with said third contact means whereby said first shunt winding is short-circuited and said second shunt winding is connected in series with said rotor so as to act as a braking means electrically absorbing dynamic energy stored in said rotor after its disconnection from said source.

3. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding connected as a series-combination with each other, one end of said series-combination of shunt windings being conductively connected with said first brush means in series with said series-exciter winding; and control switch means connected between the other terminal of said source, said shunt exciter means and said second brush means, said switch means including a group of contact means and a switching member, said group and said switching member being movable relative to each other between at least two positions, first contact means of said group being connected with said other terminal of said source, second contact means of said group being conductively connected with the other end of said series-combination of shunt windings and with said second brush means, and third contact means of said group being connected with the junction point between said first and second shunt windings, said switching member connecting in one of said positions of said switch means said first contact means with said second contact means for causing normal operation of the compound motor, while in the second position causing discontinuation of the motor operation said switching member connects said second contact means with said third contact means whereby said first shunt winding is short-circuited and said second shunt winding is connected in series with said rotor so as to act as a braking means electrically absorbing dynamic energy stored in said rotor after its disconnection from said source.

4. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding connected as a series-combination with each other, one end of said series-combination of shunt windings being conductively connected with said first brush means by being connected with the junction point between said series-exciter winding and said first brush means; and control switch means connected between the other terminal of said source, said shunt exciter means and said second brush means, said switch means including a group of contact means and a switching member, said group and said switching member being movable relative to each other between at least two positions, first contact means of said group being connected with said other terminal of said source, second contact means of said group being conductively connected with the other end of said series-combination of shunt windings and with said second brush means, and third contact means of said group being connected with the junction point between said first and second shunt windings, said switching member connecting in one of said positions of said switch means said first contact means with said second contact means for causing normal operation of the compound motor, while in the second position causing discontinuation of the motor operation said switching member connects said second contact means with said third contact means whereby said first shunt winding is short-circuited and said second shunt winding is connected in series with said rotor so as to act as a braking means electrically absorbing dynamic energy stored in said rotor after its disconnection from said source.

5. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding and an auxiliary resistor connected as a series-combination with each other, one end of said series-combination being conductively connected with said first brush means; and control switch means connected between the other terminal of said source, said shunt exciter means and said second brush means, and movable between at least two positions in one of which said other terminal of said source is connected both with the other end of said series-combination and with said second brush means for causing normal operation of the compound motor, while in the second position causing discontinuation of the motor operation said first shunt winding and auxiliary resistor are short-circuited and said second shunt winding is connected in series with said rotor so as to act as a braking means electrically absorbing dynamic energy stored in said rotor after its disconnection from said source.

6. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding and an auxiliary resistor connected as a series-combination with each other, one end of said series-combination being conductively connected with said first brush means; and control switch means connected between the other terminal of said source, said shunt exciter means and said second brush means, said switch means including a group of contact means and a switching member, said group and said switching member being movable relative to each other between at least two positions, first contact means of said group being connected with said other terminal of said source, second contact means of said group being conductively connected with the other end of said series-combination and with said second brush means, and third contact means of said group being connected with the junction point between said first and second shunt windings, said switching member connecting in one of said positions of said switch means said first contact means with said second contact means for causing normal operation of the compound motor, while in the second position causing discontinuation of the motor operation said switch member connects said second contact means with said third contact means whereby said first shunt winding and auxiliary resistor are short-circuited and said second shunt winding is connected in series with said rotor so as to act as a braking means electrically absorbing dynamic energy stored in said rotor after its disconnection from said source.

7. Dynamic brake for a compound motor control system particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding and an auxiliary resistor connected as a series-combination with each other, one end of said series-combination being conductively connected with said first brush means in series with said series-exciter winding; and control switch means connected between the other terminal of said source, said shunt exciter means and said second brush means, said switch means including a group of contact means and a switching member, said group and said switching member being movable relative to each other between at least two positions, first contact means of said group being connected with said other terminal of said source, second contact means of said group being conductively connected with the other end of said series-combination and with said second brush means, and third contact means of said group being connected with the junction point between said first and second shunt windings, said switching member connecting in one of said positions of said switch means said first contact means with said second contact means for causing normal operation of the compound motor, while in the second position causing discontinuation of the motor operation said switching member connects said second contact means with said third contact means whereby said first shunt winding and auxiliary resistor are short-circuited and said second shunt winding is connected in series with said rotor so as to act as a braking means electrically absorbing dynamic energy stored in said rotor after its disconnection from said source.

8. Dynamic brake for a compound motor control system, particularly suitable for the operation of windshield wipers on automotive and other vehicles, comprising, in combination, a source of direct current energy; a rotor and first and second brush means cooperating therewith; a series-exciter winding connected between one terminal of said source and said first brush means; shunt exciter means including a first shunt winding and a second shunt winding and an auxiliary resistor connected as a series-combination with each other, one end of said series-combination being conductively connected with said first brush means by being connected with the junction point between said series-exciter winding and said first brush means; and control switch means connected between the other terminal of said source, said shunt exciter means and said second brush means, said switch means including a group of contact means and a switching member, said group and said switching member being movable relative to each other between at least two positions, first contact means of said group being connected with said other terminal of said source, second contact means of said group being conductively connected with the other end of said series-combination and with said second brush means, and third contact means of said group being connected with the junction point between said first and second shunt windings, said switching member connecting in one of said positions of said switch means said first contact means with said second contact means for causing normal operation of the compound motor, while in the second position causing discontinuation of the motor operation said switching member connects said second contact means with said third contact means whereby said first shunt winding and auxiliary resistor are short-circuited and said second shunt winding is connected in series with said rotor so as to act as a braking means electrically absorbing dynamic energy stored in said rotor after its disconnection from said source.

References Cited by the Examiner

UNITED STATES PATENTS

| | | | |
|---|---|---|---|
| 722,936 | 3/03 | Barry | 318—381 X |
| 1,027,048 | 5/12 | Hawkins | 318—381 |
| 2,851,649 | 9/58 | Sullivan | 318—381 X |

ORIS L. RADER, *Primary Examiner.*